US010972627B2

(12) United States Patent
Kogawa et al.

(10) Patent No.: US 10,972,627 B2
(45) Date of Patent: Apr. 6, 2021

(54) INFORMATION PROCESSING APPARATUS, INFORMATION PROCESSING METHOD, AND NON-TRANSITORY COMPUTER READABLE MEDIUM FOR CORRECTING CHARACTER RECOGNITION RESULT

(71) Applicant: PFU Limited, Ishikawa (JP)

(72) Inventors: Kentaro Kogawa, Ishikawa (JP); Katsuhito Shimazaki, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 16/436,192

(22) Filed: Jun. 10, 2019

(65) Prior Publication Data
US 2020/0274988 A1 Aug. 27, 2020

(30) Foreign Application Priority Data
Feb. 22, 2019 (JP) .............................. JP2019-030395

(51) Int. Cl.
G06K 9/00 (2006.01)
H04N 1/00 (2006.01)
G06K 9/34 (2006.01)
H04N 1/32 (2006.01)

(52) U.S. Cl.
CPC ..... *H04N 1/32122* (2013.01); *G06K 9/00483* (2013.01); *G06K 9/344* (2013.01); *H04N 1/00331* (2013.01); *G06K 2209/01* (2013.01)

(58) Field of Classification Search
CPC .......... H04N 1/32122; H04N 1/00331; G06K 9/344; G06K 9/00483; G06K 2209/01
See application file for complete search history.

(56) References Cited

U.S. PATENT DOCUMENTS

| 9,292,739 B1 * | 3/2016 | Gray ........................ G06K 9/033 |
| 2006/0133670 A1 * | 6/2006 | Barrus .................... G06F 16/93 |
| | | 382/173 |
| 2009/0077658 A1 * | 3/2009 | King ....................... G06F 16/951 |
| | | 726/21 |
| 2017/0263013 A1 * | 9/2017 | Okubo ................ G06K 9/6232 |
| 2019/0279041 A1 * | 9/2019 | Kimura ................ G06K 9/6263 |

FOREIGN PATENT DOCUMENTS

| JP | 04-267492 A | 9/1992 |
| JP | 2006-244518 A | 9/2006 |

* cited by examiner

Primary Examiner — Juan M Guillermety
(74) Attorney, Agent, or Firm — McDermott Will & Emery LLP

(57) ABSTRACT

An information processing apparatus comprising a memory; a non-volatile memory; and a processor coupled to the memory and the non-volatile memory, the processor configured to: store a rectification history for a result of character recognition processing in association with items and item values; compare, for the respective items, a newly input result of the character recognition processing with the item values stored in the non-volatile memory; select a set of the item values stored in the non-volatile memory based on a result of the comparison; and correct the newly input result of the character recognition processing by using the selected set of the item values.

5 Claims, 23 Drawing Sheets

Input information correction apparatus 5

Overview of rectification history registration process (S10)

Input information correction process (S20)

Scanned image

Comparison between extracted item values
and item values in rectification history Structure of rectification history DB 600 (four item values)

FIG. 8A

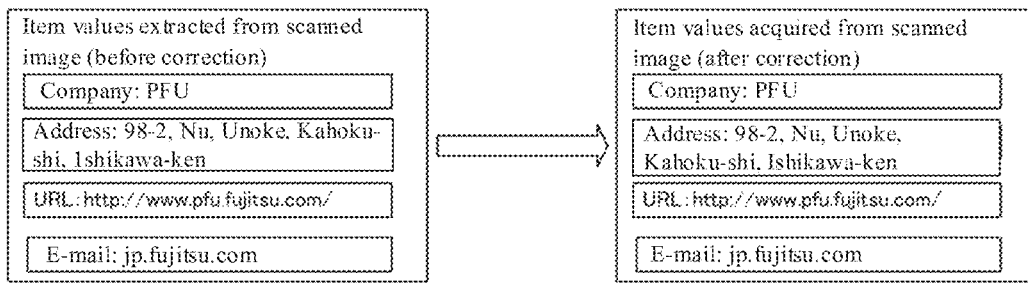

Recognition result of OCR before correction and recognition result after correction

FIG. 8B

Company table

| CompanyID | Company |
|---|---|
| Com_01 | PFU |

Address table

| AddressID | Address |
|---|---|
| Add_01 | 98-2, Nu, Unoke, Kahoku-shi, Ishikawa-ken |
| Add_02 | 98-2, Nu, Unoke, Kahoku-shi, Ishikawa-ken |

URL table

| URLID | URL |
|---|---|
| Url_01 | http://www.pfu.fujitsu.com/ |

Email table

| EmailID | Email |
|---|---|
| Ema_01 | jp.fujitsu.com |

MetaDataSet table

| MetaDataSetID | CompanyID | AddressID | URLID | EmailID |
|---|---|---|---|---|
| Set_01 | Com_01 | Add_01 | Url_01 | Ema_01 |
| Set_02 | Com_01 | Add_02 | Url_01 | Ema_01 |

Correction table

| CorrectionID | BeforeSetID | AfterSetID |
|---|---|---|
| Cor_01 | Set_01 | Set_02 |

Specific example of rectification history DB 600 registered by "input information correction process"

Extraction process of similar item values (S40)

Refinement of sets of item values for use in correction (S50)

Search for item values for correction goal and correction (S60)

FIG. 13A

 Document Image
Business Unit
Document Solutions
Division
First Development
Department 

OOO OOO

PFU LIMITED
98-2, Nu, Unoke, Kahoku-shi, Ishikawa-ken,
Japan 929-1192
Tel:076-283-1212
Fax:076-283-4689
E-mail:×××.×××.pfu@jp.fujitsu.com
http://www.pfu.fujitsu.com/

Item values extracted from scanned image (before correction)

Company: PFU

Address: 98-2. Nu. Unoke, Kahoku-shi, Ishikawa-ken

URL:http://www.pfu.fujitsu.com/

E-mail: jp.fujitsu.oom

Items and item values extracted from scanned image

FIG. 13B

Company table

| CompanyID | Company |
|---|---|
| Com_01 | PEU |
| Com_02 | PLA |
| Com_03 | PFU |
| Com_04 | Fujitsu |

Address table

| AddressID | Address |
|---|---|
| Add_01 | 98-2, Nu, Unoke, Kahoku-shi, Ishikawa-ken |
| Add_02 | 3-1, Yokohama, Tsubatamachi, Kahoku-gun, Ishikawa-ken |
| Add_03 | 98-2, Nu, Unoke, Kahoku-shi, Ishikawa-ken |

URL table

| URLID | URL |
|---|---|
| Url_01 | http://www.pfu.fujitsu.com/ |
| Url_02 | http://www.ppp.co.jp |
| Url_03 | http://www.pfu.fujitsu.com/ |
| Url_04 | http://www.fujitsu.com/ |

Email table

| EmailID | Email |
|---|---|
| Ema_01 | jp.fujitsu.com |
| Ema_02 | jp.fujitsu.con |
| Ema_03 | jp.fujitsu.com |

MetaDataSet table

| MetaDataSetID | CompanyID | AddressID | URLID | EmailID |
|---|---|---|---|---|
| Set_01 | Com_01 | Add_03 | Url_03 | Ema_03 |
| Set_02 | Com_02 | Add_03 | Url_03 | Ema_03 |
| Set_03 | Com_03 | Add_01 | Url_03 | Ema_03 |
| Set_04 | Com_03 | Add_02 | Url_03 | Ema_03 |
| Set_05 | Com_03 | Add_03 | Url_01 | Ema_03 |
| Set_06 | Com_03 | Add_03 | Url_02 | Ema_03 |
| Set_07 | Com_03 | Add_03 | Url_03 | Ema_01 |
| Set_08 | Com_03 | Add_03 | Url_03 | Ema_02 |
| Set_09 | Com_03 | Add_03 | Url_03 | Ema_03 |
| Set_10 | Com_04 | Add_03 | Url_04 | Ema_01 |
| Set_11 | Com_04 | Add_03 | Url_04 | Ema_03 |

Correction table

| CorrectionID | BeforeSetID | AfterSetID | The number of times of rectification |
|---|---|---|---|
| Cor_01 | Set_01 | Set_09 | 3 |
| Cor_02 | Set_02 | Set_09 | 1 |
| Cor_03 | Set_03 | Set_09 | 1 |
| Cor_04 | Set_04 | Set_09 | 1 |
| Cor_05 | Set_05 | Set_09 | 1 |
| Cor_06 | Set_06 | Set_09 | 1 |
| Cor_07 | Set_07 | Set_09 | 2 |
| Cor_08 | Set_08 | Set_09 | 1 |
| Cor_09 | Set_10 | Set_11 | 3 |

Tables for use in extraction of set of item values and correction

Example of search process for set of item values based on similar item value

| MetaDataSetID | Company | Address | URL | Email |
|---|---|---|---|---|
| Set_09 | ○ | ○ | ○ | ○ |
| Set_11 | × | ○ | × | ○ |

※○ : Found based on this item    × : Not found based on this item

Results of search for correction goal per item

Correction process on set of item values that is not present in rectification history DB 600

FIG. 17A

| Number of times | Processing time of conventional technique [millisecond] | Processing time of input information correction apparatus 5 [millisecond] |
|---|---|---|
| 1 | 31 | 48 |
| 2 | 34 | 42 |
| 3 | 33 | 41 |
| 4 | 32 | 51 |
| 5 | 30 | 58 |

Business cards for 40 companies are registered in rectification history

FIG. 17B

| Number of times | Processing time of conventional technique [millisecond] | Processing time of input information correction apparatus 5 [millisecond] |
|---|---|---|
| 1 | 99 | 81 |
| 2 | 96 | 78 |
| 3 | 100 | 85 |
| 4 | 92 | 80 |
| 5 | 99 | 76 |

Business cards for 480 companies are registered in rectification history

FIG. 17D

| Number of registered business cards | Dictionary size of conventional technique | Dictionary size of input information correction apparatus 5 |
|---|---|---|
| 40 companies | 145KB | 60KB |
| 480 companies | 1870KB | 440KB |

Changes of dictionary size versus number of data pieces

INFORMATION PROCESSING APPARATUS, INFORMATION PROCESSING METHOD, AND NON-TRANSITORY COMPUTER READABLE MEDIUM FOR CORRECTING CHARACTER RECOGNITION RESULT

CROSS-REFERENCE TO RELATED APPLICATIONS

This application is based on and claims priority under 35 USC 119 from Japanese Patent Application No. 2019-030395 filed Feb. 22, 2019.

FIELD

The present invention relates to an information processing apparatus, an information processing method, and a non-transitory computer readable medium.

BACKGROUND

For example, JP 2006-244518 A discloses an input rectifying method of rectifying data of a plurality of input items per item, the method including a certainty calculation means for calculating certainty with respect to a content of each of the items and an updating means for updating the content of the item by using the certainty calculated by the certainty calculation means.

Additionally, JP H4-267492 A discloses a method of rectifying recognition data of a business card, where a business card recognition apparatus recognizes characters from an image of the business card scanned by a scanner and generates business card data in a format to classify respective items such as a company name, a name, and an address in the business card. The business card recognition apparatus is provided with a business card data file in which the business card data is sequentially stored and a rectified data file in which rectified business card data that has been checked and rectified by a user is sequentially stored. The method includes determining whether a business card previously rectified and the business card to be rectified thereafter are business cards of the same company by comparing partial items of the business card data and copying, when both of them are the business cards of the same company, only the items that have the same contents between both of them out of the rectified data of the business card previously rectified to the business card data of the business card to be rectified thereafter.

SUMMARY OF THE INVENTION

An object is to provide an information processing apparatus that enables correction of a set of item values even if there is no rectification history for the set.

According to an aspect of the invention, there is provided an information processing apparatus comprising a memory; a non-volatile memory; and a processor coupled to the memory and the non-volatile memory, the processor configured to store a rectification history for a result of character recognition processing in association with items and item values; compare, for the respective items, a newly input result of the character recognition processing with the item values stored in the non-volatile memory; select a set of the item values stored in the non-volatile memory based on a result of the comparison; and correct the newly input result of the character recognition processing by using the selected set of the item values.

According to another aspect of the invention, there is provided an information processing method comprising the steps of storing a rectification history with respect to a result of character recognition processing in association with items and item values; comparing the item values of a newly input result of the character recognition processing with the stored item values for the respective items; selecting a set of the stored item values based on a result of the comparison; and correcting the newly input result of the character recognition processing by using the selected set of the item values.

According to another aspect of the invention, there is provided a non-transitory computer-readable recording medium storing thereon a computer program that causes a computer to perform a method comprising: storing a rectification history with respect to a result of character recognition processing in association with items and item values; comparing the item values of a newly input result of the character recognition processing with the stored item values for the respective items; selecting a set of the stored item values based on a result of the comparison; and correcting the newly input result of the character recognition processing by using the selected set of the item values.

BRIEF DESCRIPTION OF THE DRAWINGS

FIG. 8A is a diagram exemplifying the recognition result of OCR before correction and recognition result after correction. FIG. 8B is a specific example of rectification history DB 600 with registration result by "input information correction process".

FIG. 13A exemplifies a false recognition result of the scanned image. FIG. 13B are tables for use in extraction of set of item values and correction FIG. 14A is an example of search process for set of item values based on similar. FIG. 14B exemplifies a false recognition results of search for correction goal per item.

FIG. 16A exemplifies the item values to be corrected and the item values after rectification are not similar. FIG. 16B exemplifies the item values to be corrected and the item values before rectification are not similar.

FIG. 17A is a table showing a processing time in a case where business card data for 40 companies has been registered in a rectification history DB; FIG. 17B is a table showing a processing time in a case where business card data for 480 companies has been registered in the rectification history DB; FIG. 17D is a table comparing file sizes of dictionary data in the rectification history DB in respective cases where the business card data for 40 companies has been registered and where the business card data for 480 companies has been registered.

DESCRIPTION OF EMBODIMENTS

Embodiments of the present invention will be described with reference to the drawings.

Figure 1:
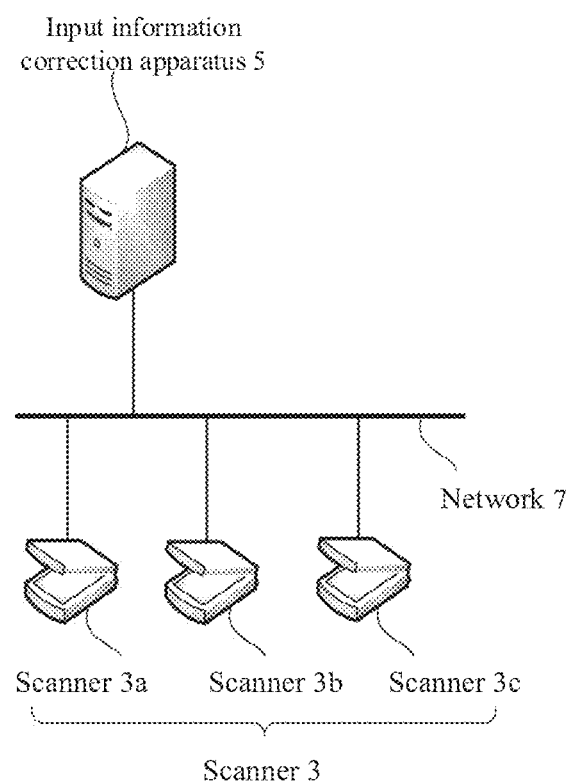
FIG. 1 is a diagram exemplifying an overall configuration of an input information correction system 1

FIG. 1 is a diagram exemplifying an overall configuration of an input information correction system 1.

As exemplified in FIG. 1, the input information correction system 1 includes a plurality of scanners 3a, 3b, and 3c and an input information correction apparatus 5, which are connected to each other via a network 7. The scanners 3a, 3b, and 3c are collectively referred to as a scanner 3. The scanner 3 transmits image data acquired with an optical reader to the input information correction apparatus 5. In this example, assume that the scanner 3 scans documents or business cards.

The input information correction apparatus 5 is a computer terminal, which recognizes characters of the image data received from the scanner 3 and corrects the recognized characters. A result of the character recognition on the image data is taken as input information. Specifically, the input information correction apparatus 5 performs Optical Character Recognition (OCR) processing on the image data and corrects the input information based on a rectification history. Note that the input information correction apparatus 5 is an example of an information processing apparatus according to the present invention.

Figure 2:
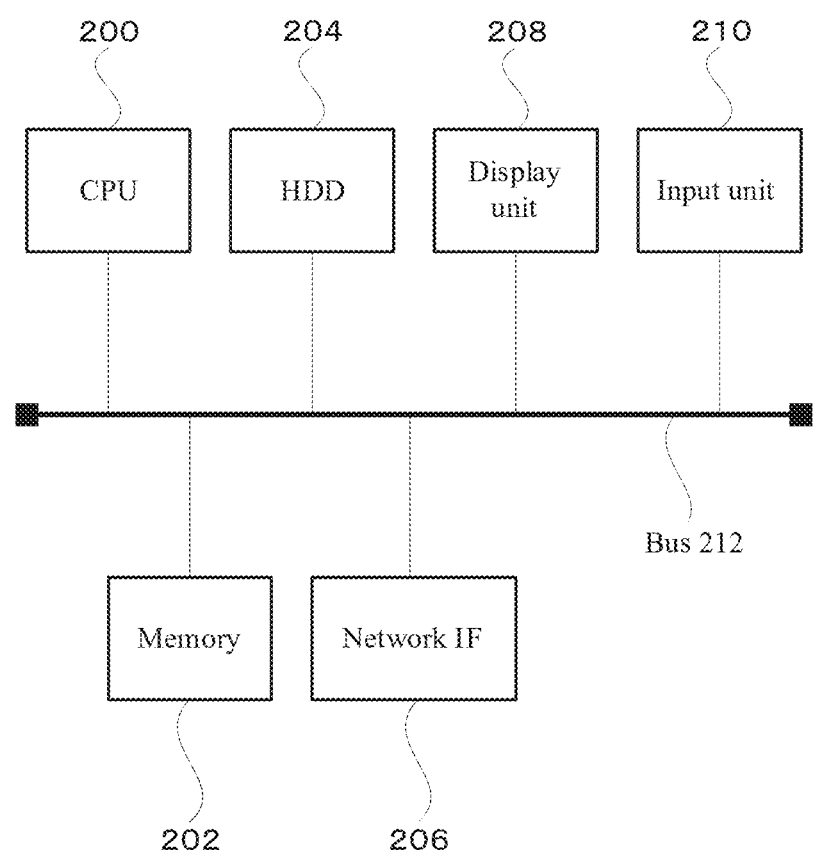
FIG. 2 is a diagram exemplifying a hardware configuration of the input information correction apparatus 5.

FIG. 2 is a diagram exemplifying a hardware configuration of the input information correction apparatus 5.

As exemplified in FIG. 2, the input information correction apparatus 5 includes a CPU 200, a memory 202, an HDD 204, a network interface 206 (a network IF 206), a display unit 208, and an input unit 210 and these components are connected to each other via a bus 212.

The CPU 200 is, for example, a central processing unit. The memory 202 is, for example, a volatile memory and serves as a main storage unit.

Figure 3:
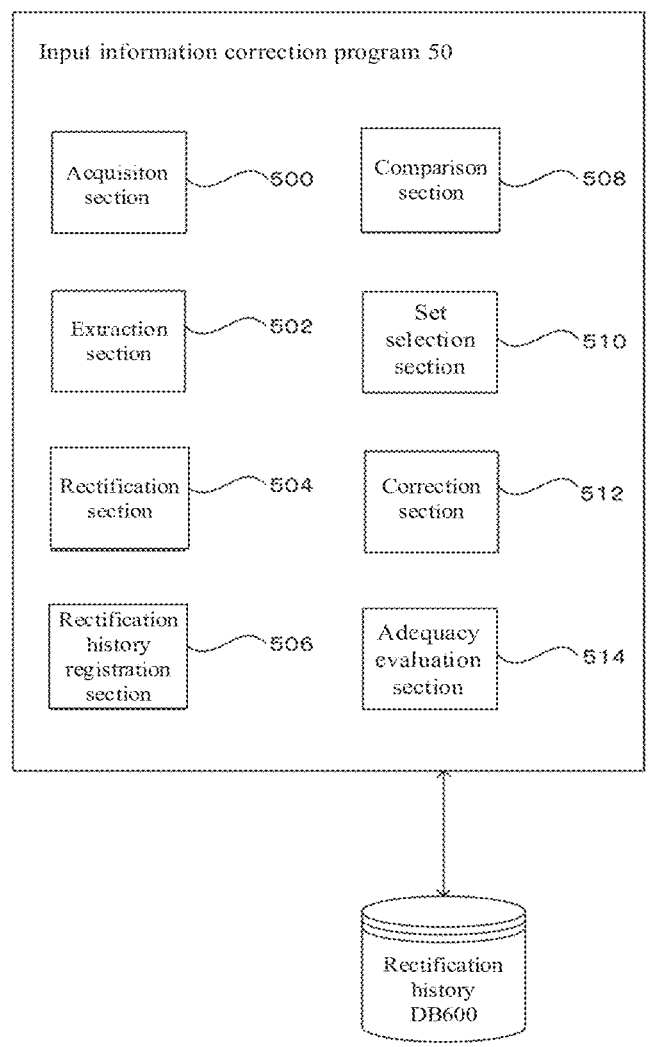
FIG. 3 is a diagram exemplifying a functional configuration of the input information correction apparatus 5.

The HDD 204 is, for example, a hard disc drive unit and stores, as a nonvolatile recording unit, a computer program (for example, an input information correction program 50 in FIG. 3) and other data files (for example, a rectification history database 600 in FIG. 3).

The network IF 206 is an interface for wired or wireless communication and achieves, for example, communication over the internal network 7. The display unit 208 is, for example, a liquid crystal display.

The input unit 210 is, for example, a keyboard and mouse.

FIG. 3 is a diagram exemplifying a functional configuration of the input information correction apparatus 5.

As exemplified in FIG. 3, in the input information correction apparatus 5 in this example, the input information correction program 50 is installed and the rectification history database 600 (rectification history DB 600) is configured.

The input information correction program 50 includes an acquisition section 500, an extraction section 502, a rectification section 504, a rectification history registration section 506, a comparison section 508, a set selection section 510, a correction section 512, and an properness evaluation section 514.

Note that apart of or all parts of the input information correction program 50 may be implemented by a hardware such as an ASIC or may be implemented by utilizing some of functions of an Operating System (OS).

In the input information correction program 50, the acquisition section 500 acquires image data transmitted from the scanner 3.

The extraction section 502 extracts meta-information from the scanned image of a document or a business card. The meta-information is defined for each type of documents or business cards and includes item names and item values. The item names represent meanings of the meta-information and the item values represent contents of the meta-information. Specifically, the item names of a business card include a name, a company name, an address, and the like. The item names of a receipt include a shop name, a phone number, an issue date, and the like. The item names of a general document include a date, a document title, an author, and the like. Specifically, the extraction section 502 performs an Optical Character Recognition (OCR) processing on the image data acquired by the acquisition section 500 and extracts the meta-information.

The rectification section 504 executes, depending on a user operation, rectification of the result of the character recognition processing.

The rectification history registration section 506 additionally registers the items and the item values after rectification rectified by the rectification section 504 in association with the item values before rectification to the rectification history DB 600.

Here, the rectification history DB 600 stores the rectification history with respect to the result of the character recognition processing in association with the items and the item values. Specifically, the rectification history DB 600 stores the item values before rectification and the item values after rectification in association with each other. Note that the rectification history DB 600 is an example of a rectification history storage section according to the present invention.

The comparison section 508 compares the item values of a newly input result of the character recognition processing with the item values stored in the rectification history DB 600 for respective items. Specifically, the comparison section 508 compares the item values before rectification and the item values after rectification stored in the rectification history DB 600 with the item values included in the newly input result of the character recognition processing. More specifically, the comparison section 508 determines, when the item values before rectification or the item values after rectification stored in association with each other in the rectification history DB 600 are similar to the newly input item values, that the item values are matched. This means that the comparison section 508 searches for the item values extracted by the extraction section 502 to determine whether the item values are present in the rectification history DB 600 as the item values before rectification or the item values after rectification.

The set selection section 510 selects a set of the item values stored in the rectification history DB 600 based on a result of the comparison by the comparison section 508. Specifically, the set selection section 510 selects the set of the item values of which total similarity of all the item values of the items is high. More specifically, the set selection section 510 selects the set of the item values for use in correction based on the respective item values determined to be present in the rectification history DB 600 by the comparison section 508. In a case where there are more than one set of the item values for use in rectification, the set selection section 510 selects a set of the item values based on the similarity calculated by the comparison section 508.

The correction section 512 corrects the newly input result of the character recognition processing (input information) by using the set of the item values selected by the set selection section 510. Specifically, the correction section 512 executes correction when the properness evaluation section 514 (mentioned below) affirms properness.

The properness evaluation section 514 evaluates the properness of the set of the item values selected by the set selection section 510 based on an amount of correction by the correction section 512 or the number of times of rectification regarding the rectification history stored in the rectification history DB 600.

Next, an overview of a correction process of input information will be described.

The correction process of the input information consists of a "rectification history registration process" and an "input information correction process". The "rectification history registration process" creates the rectification history DB 600 that stores rectification histories to be searched for item values for a correction goal. Based on the created rectification history DB 600, the item values are corrected in the "input information correction process".

The "rectification history registration process" is executed after rectification of the item values through manual input by a user and the "input information correction process" is executed after extraction of item values from a result of OCR processing of the input information. The "rectification history registration process" and the "input information correction process" run independently.

Figure 4:
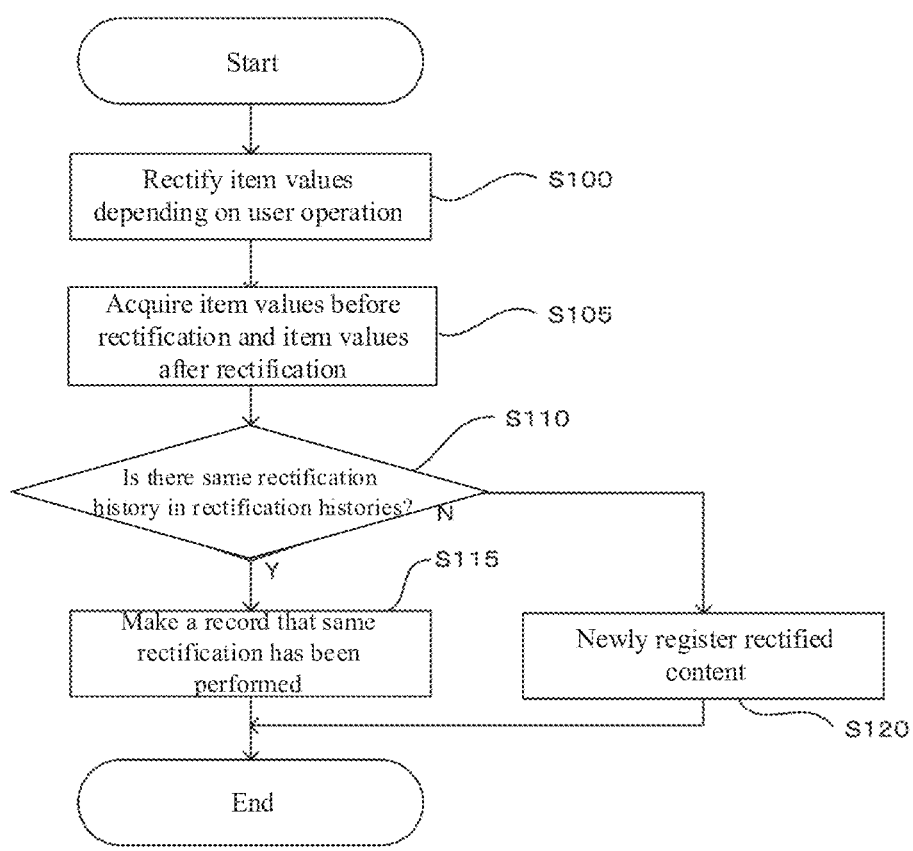
FIG. 4 is a flowchart illustrating an overview of the rectification history registration process (S10).

FIG. 4 is a flowchart illustrating an overview of the rectification history registration process (S10).

As exemplified in FIG. 4, in step 100 (S100), the rectification section 504 accepts rectification of a result of OCR character recognition (input information) through a manual input by a user and rectifies the item values.

In step 105 (S105), the rectification history registration section 506 acquires item values before rectification and item values after rectification.

In step 110 (S110), if there is a rectification history having the same item values before rectification and the same item values after rectification in the rectification histories stored in the rectification history DB 600, the overview of the rectification history registration process (S10) proceeds to S115. If there is no same rectification history, it proceeds to S120.

In step 115 (S115), the rectification history registration section 506 makes a record that the same rectification has been performed in the rectification history stored in the rectification history DB 600.

In step 120 (S120), the rectification history registration section 506 newly registers the rectified content to the rectification history DB 600.

Figure 5:
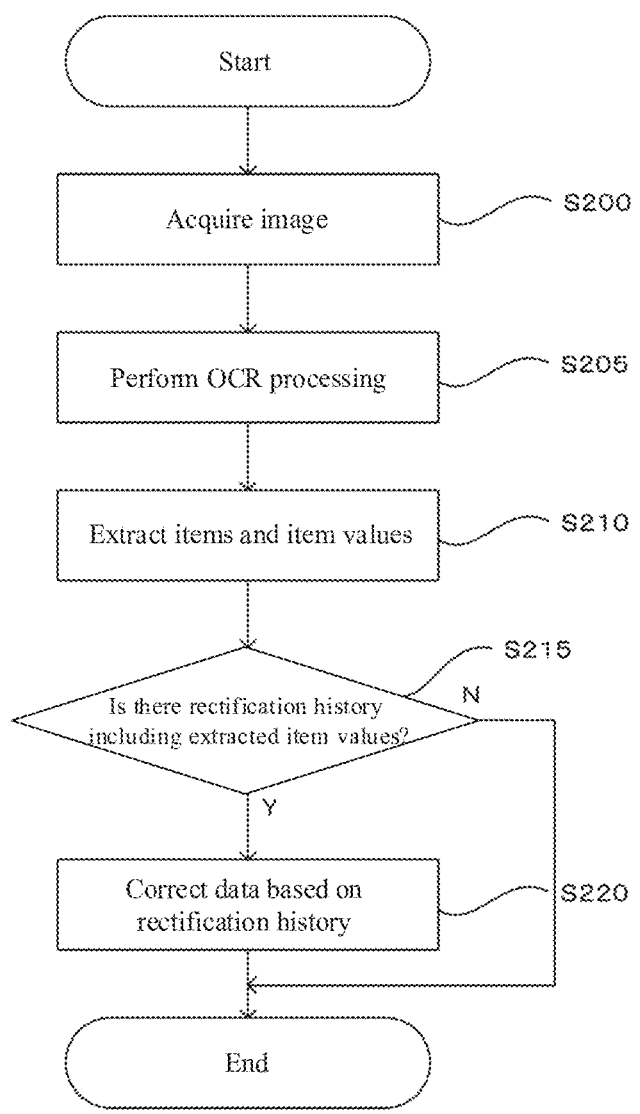
FIG. 5 is a flow chart illustrating the input information correction process (S20).

FIG. 5 is a flow chart illustrating the input information correction process (S20).

Figure 6A:
FIG. 6A exemplifies an image scanned by the scanner 3.
Figure 6B:
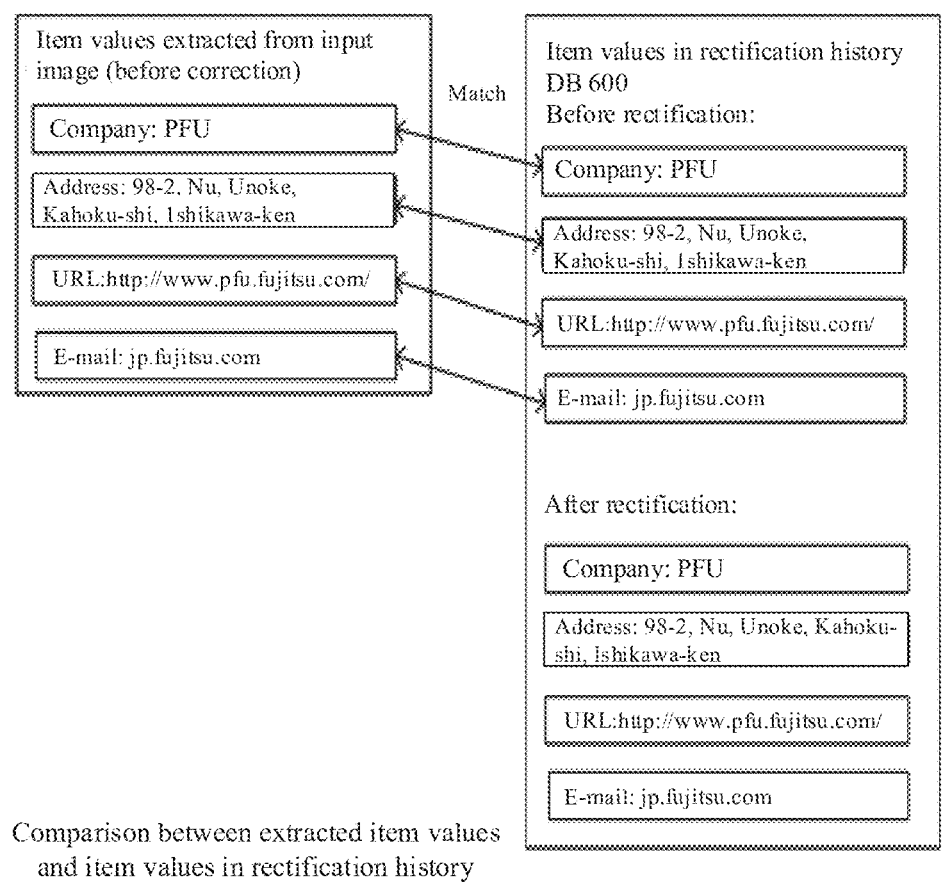
FIG. 6B is an example of comparison between extracted item values and item values in a rectification history.
Figure 6C:
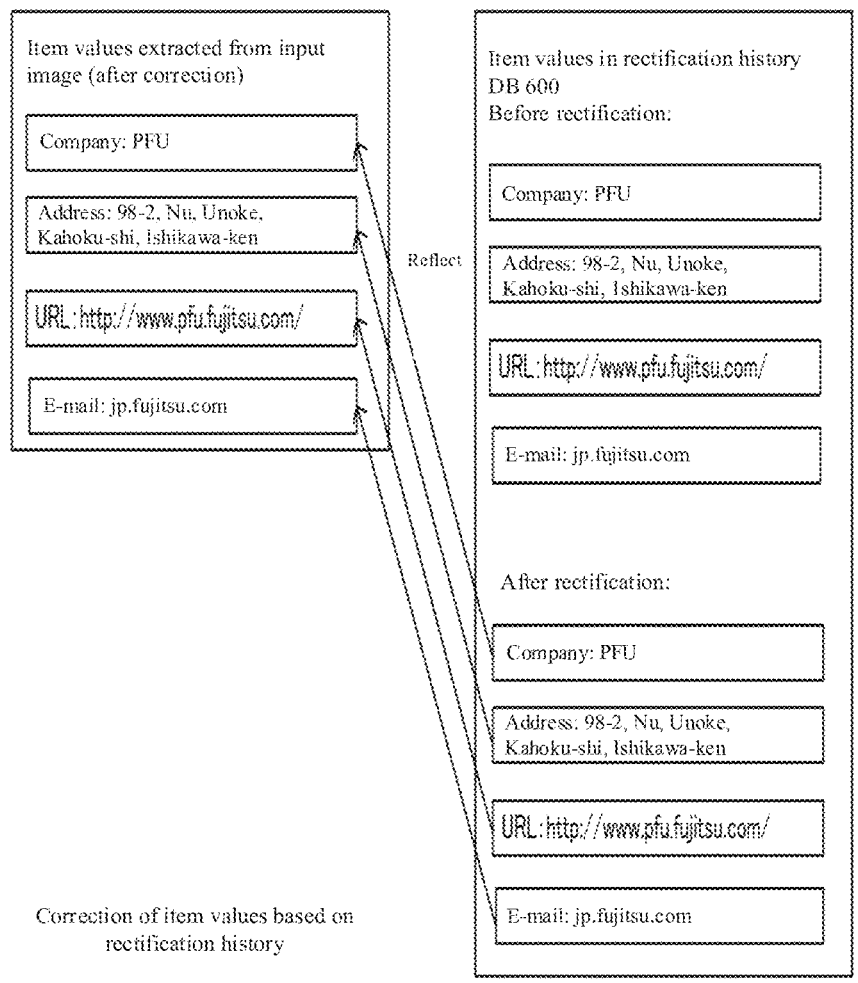
FIG. 6C is an example of correction of the item values based on the rectification history.

FIG. 6A exemplifies an image scanned by the scanner 3. FIG. 6B is an example of comparison between extracted item values and item values in a rectification history. FIG. 6C is an example of correction of the item values based on the rectification history.

In step 200 (S200), as exemplified in FIG. 6A, the acquisition section 500 acquires the image data scanned by the scanner 3.

In step 205 (S205), the extraction section 502 performs OCR processing on the image data acquired by the acquisition section 500.

In step 210 (S210), the extraction section 502 extracts the item values to be corrected from the input information that is a result of the OCR processing. Specifically, as exemplified in FIG. 6B, the extraction section 502 extracts the items including COMPANY, ADDRESS, URL, and E-MAIL and the item values thereof.

In step 215 (S215), the comparison section 508 compares the item values to be corrected that have been extracted by the extraction section 502 with the item values stored in the rectification history DB 600. As a result of the comparison, as exemplified in FIG. 6B, if there are item values matching the item values to be corrected, the input information correction process (S20) proceeds to S220. If there are not the matching item values, the input information correction process (S20) ends.

In step 220 (S220), as exemplified in FIG. 6C, the correction section 512 corrects the item values to be corrected to the item values after rectification regarding the matching item values.

Figure 7:
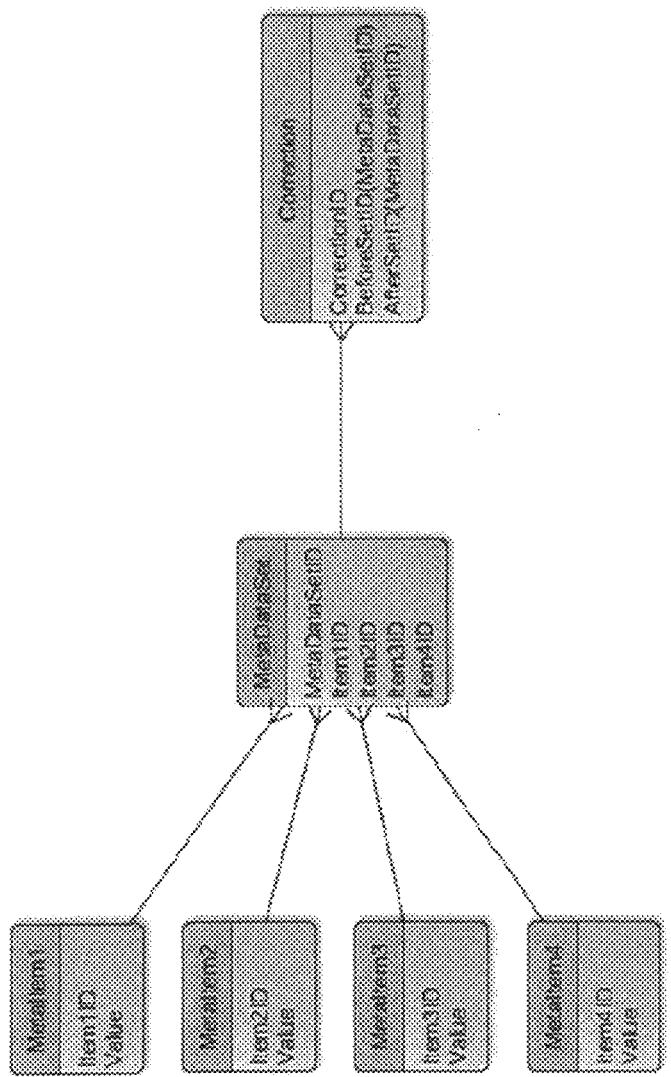
FIG. 7 is a diagram exemplifying a structure of the rectification history DB 600.

FIG. 7 is a diagram exemplifying a structure of the rectification history DB 600.

The rectification history DB 600 includes MetaItem tables, a MetaDataSet table, and a Correction table.

The MetaItem tables store respective items of meta-information. Each of the MetaItem tables includes an item value of each item and an ID number associated with the item value. There are as many MetaItem tables as items related to each of types of documents.

The MetaDataSet table is a table that stores a set of item values that can be extracted from one piece of the input information. "Item1ID" to "Item4ID" in the MetaDataSet table are identical to "Item1ID" in the MetaItem 1 table to "Item4ID" in the MetaItem 4 table, respectively. Additionally, a "MetaDataSetID" indicates an ID number assigned to each set of the item values.

The Correction table is a table that stores information on respective sets of item values before rectification and item values after rectification. A "BeforeSetID" indicates information before rectification and an "AfterSetID" indicates information after rectification. Substantial instances of the "BeforeSetID" and the "AfterSetID" are "MetaDataSetIDs".

In a case of retrieval of a content rectified by a user, the respective item values can be acquired by referring to records of interest in the "MetaDataSet" table based on a "BeforeSetID" and an "AfterSetID" in the Correction table and by retrieving "ItemIDs (the Item1ID to the Item4ID in FIG. 7)" included in those records from the respective MetaItem tables.

FIGS. 8A and 8B show a specific example of the rectification history DB 600 to which registration is performed by the "input information correction process".

FIG. 8A shows a recognition result of OCR processing where character "ishi" of word "ishikawa-ken" in an address part of a business card is falsely recognized as "1shi" and the recognition result corrected by the "input information correction process". When the false recognition result is rectified depending on a user operation, tables exemplified in FIG. 8B are registered to the rectification history DB 600. Specifically, in a Company table, "Com_01" is registered as a "CompanyID" and "PFU" is registered as a "COMPANY". In an Address table, "Add_01" is registered as an "AddressID" and "98-2, Nu, Unoke, Kahoku-shi, Ishikawa-ken" is registered as an "ADDRESS", which is the false recognition result. Then "Add_02" is registered as an "AddressID" and "98-2, Nu, Unoke, Kahoku-shi, Ishikawa-ken" is registered as an "ADDRESS", which is a result after rectification. In a URL table, "Url_01" is registered as a "URLID" and "http://www.pfu.fujitsu.com/" is registered as a "URL". In an Email table, "Ema_01" is registered as an "EmailID" and "jp.fujitsu.com" is registered as an "E-MAIL" In a MetaDataSet table, "Set_01" is registered as a "MetaDataSetID", "Com_01" is registered as a "CompanyID", "Add_01" is registered as an "AddressID", "Url_01" is registered as a "URLID", and "Ema_01" is registered as an "EmailID", which is the false recognition result. Then "Set_02" is registered as a "MetaDataSetID", "Com_01" is registered as a "CompanyID", "Add_02" is registered as an "AddressID", "Url_01" is registered as a "URLID", and "Ema_01" is registered as an "EmailID", which is the result after rectification. In a Correction table, "Cor_01" is registered as a "CorrectionID", "Set_01" is registered as a "BeforeSetID", and "Set_02" is registered as an "AfterSetID".

Figure 9:
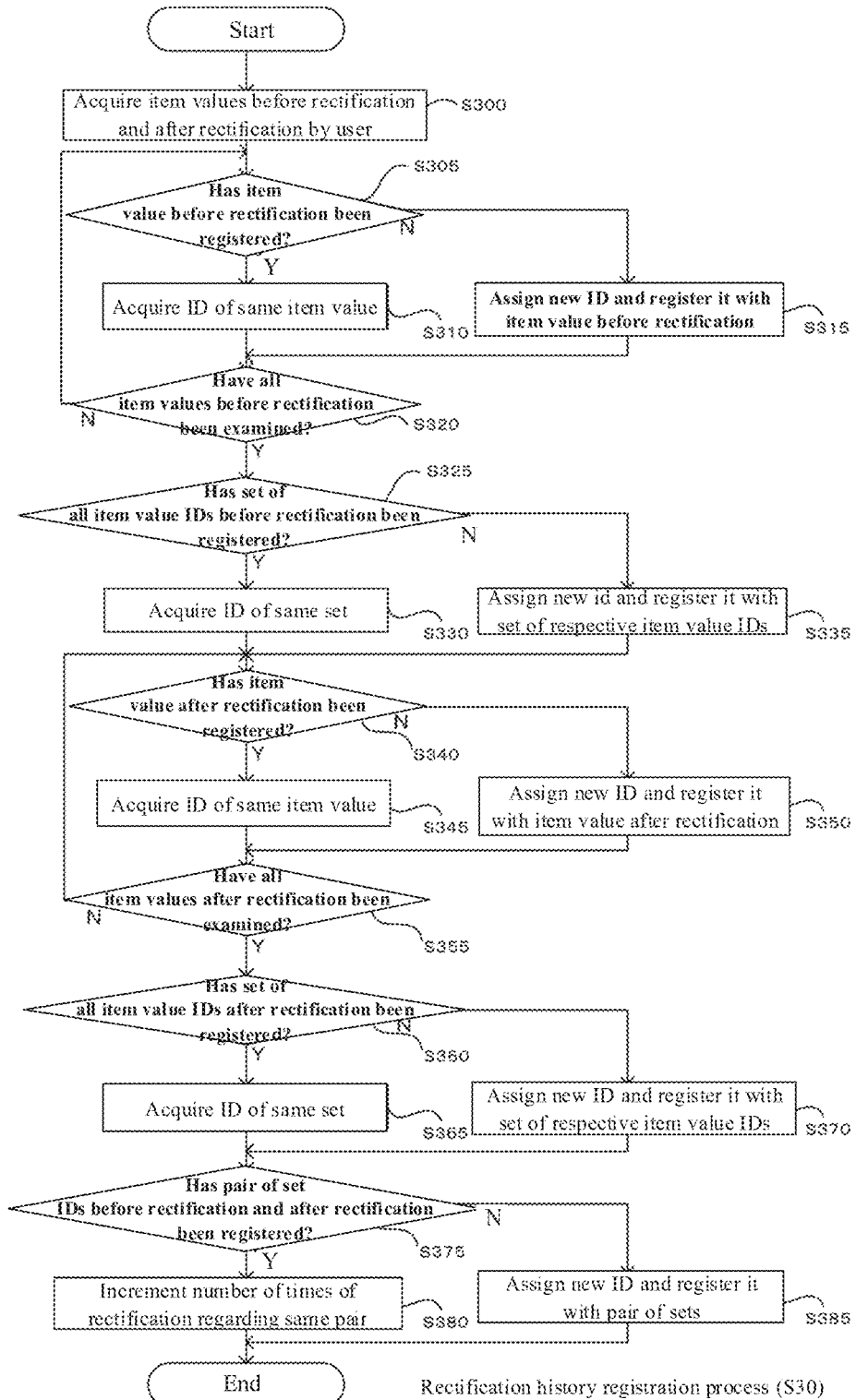
FIG. 9 is a flow chart illustrating the rectification history registration process (S30).

FIG. 9 is a flow chart illustrating the rectification history registration process (S30) (more detailed process of the overview of the rectification history registration process (S10)).

As exemplified in FIG. 9, in step 300 (S300), the rectification history registration section 506 acquires item values before rectification and item values after rectification regarding the items rectified by a user.

In step 305 (S305), the rectification history registration section 506 judges whether each of the acquired item values before rectification has been registered in the rectification history DB 600. If registered, the rectification history registration process (S30) proceeds to S310. If not registered, it proceeds to S315.

In step 310 (S310), the rectification history registration section 506 acquires the ID number of the same item value.

In step 315 (S315), the rectification history registration section 506 assigns a new ID number and registers the ID number with the item value before rectification to the rectification history DB 600.

In step 320 (S320), if it has been judged, for all the item values before rectification, whether the registration to the rectification history DB 600 has been performed, the rectification history registration process (S30) proceeds to S325. If it has not been judged, for all the item values before rectification, whether the registration to the rectification history DB 600 has been performed, the rectification history registration process (S30) proceeds to S305.

In step 325 (S325), the rectification history registration section 506 judges whether the same set as that of all the ID numbers of the item values before rectification has been registered in the rectification history DB 600. If registered, the rectification history registration process (S30) proceeds to S330. If not registered, it proceeds to S335.

In step 330 (S330), the rectification history registration section 506 acquires the ID number of the same set.

In step 335 (S335), the rectification history registration section 506 assigns a new ID number and registers the ID number with the set of the ID numbers of the respective item values to the rectification history DB 600.

In step 340 (S340), the rectification history registration section 506 examines the item values after rectification. The rectification history registration section 506 judges whether each of the acquired item values after rectification has been registered in the rectification history DB 600. If registered, the rectification history registration process (S30) proceeds to S345. If not registered, it proceeds to S350.

In step 345 (S345), the rectification history registration section 506 acquires the ID number of the same item value.

In step 350 (S350), the rectification history registration section 506 assigns a new ID number and registers the ID number with the item value after rectification to the rectification history DB 600.

In step 355 (S355), if it has been judged, for all the item values after rectification, whether the registration to the rectification history DB 600 has been performed, the rectification history registration process (S30) proceeds to S360. If it has not been judged, for all the item values before rectification, whether the registration to the rectification history DB 600 has been performed, the rectification history registration process (S30) proceeds to S340.

In step 360 (S360), the rectification history registration section 506 judges whether the same set as that of the ID numbers of all the item values after rectification has been registered in the rectification history DB 600. If registered, the rectification history registration process (S30) proceeds to S365. If not registered, it proceeds to S370.

In step 365 (S365), the rectification history registration section 506 acquires the ID number of the same set.

In step 370 (S370), the rectification history registration section 506 assigns a new ID number and registers the ID number with the set of the ID numbers of the respective item values to the rectification history DB 600.

In step 375 (S375), the rectification history registration section 506 judges whether a pair of the ID numbers of the set before rectification and the set after rectification has been registered in the rectification history DB 600. If registered, the rectification history registration process (S30) proceeds to S380. If not registered, it proceeds to S385.

In step 380 (S380), the rectification history registration section 506 increments the number of times of rectification regarding the registered pair of the ID numbers of the set before rectification and the set after rectification.

In step 385 (S385), the rectification history registration section 506 assigns a new ID number and registers the ID number with the pair of the ID numbers of the set before rectification and the set after rectification to the rectification history DB 600.

Next, the "input information correction process" will be described. The "input information correction process" consists of three steps of "extraction of similar item values", "refinement of sets of rectification history for use in correction", and "search for item values for correction goal and correction process".

Each of the three steps will be described.

Figure 10:
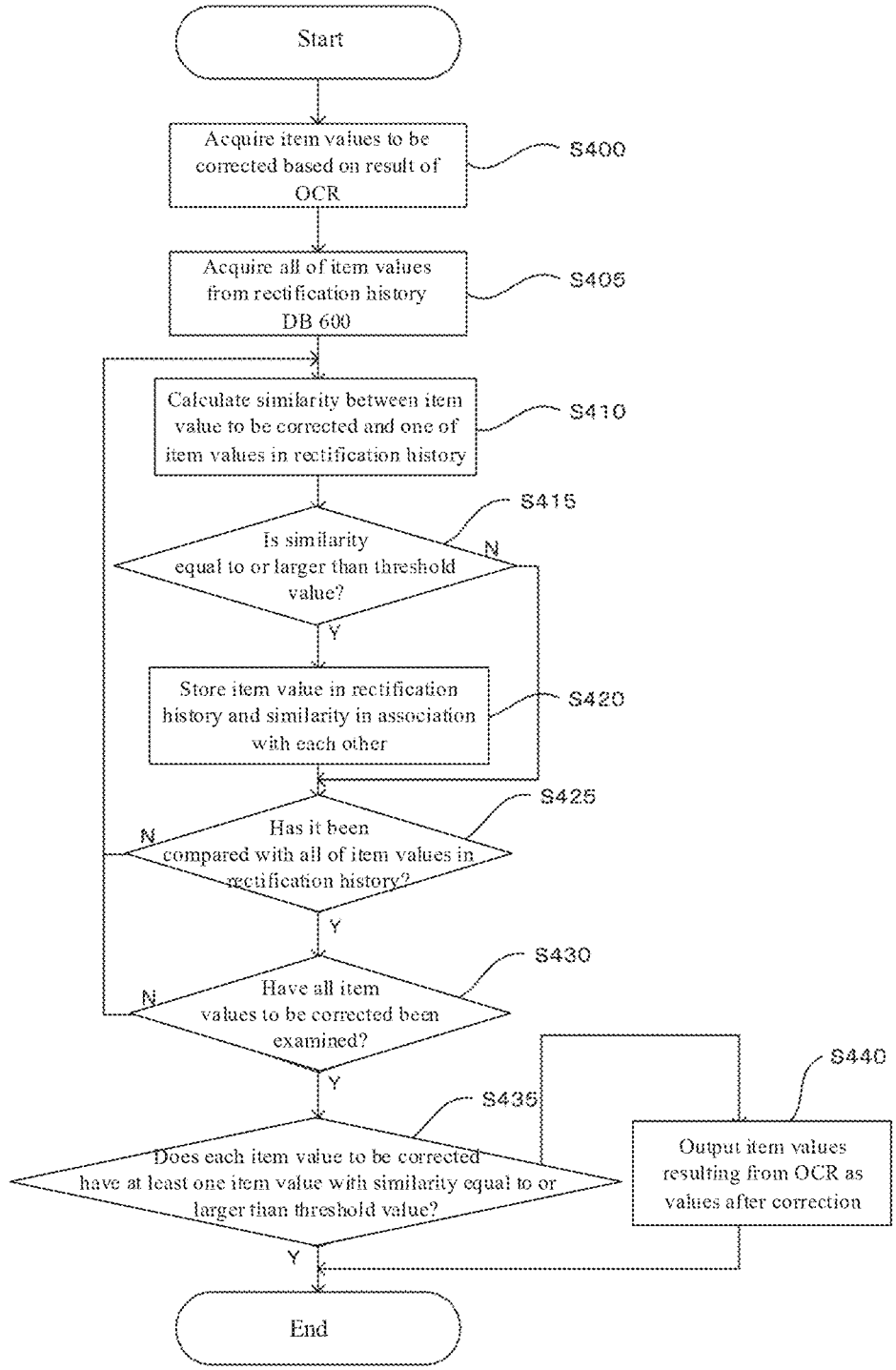
FIG. 10 is a flowchart illustrating the extraction of similar item values process (S40).

FIG. 10 is a flowchart illustrating the extraction of similar item values process (S40).

As exemplified in FIG. 10, in step 400 (S400), the extraction section 502 extracts item values to be corrected from a result of OCR processing.

In step 405 (S405), the comparison section 508 acquires all of the item values stored in the rectification history DB 600.

In step 410 (S410), the comparison section 508 calculates a similarity between one of the item values to be corrected and one of the item values in the rectification history acquired in S405. Specifically, the comparison section 508 calculates the similarity based on the Levenshtein distance.

In step 415 (S415), the comparison section 508 determines whether the similarity is equal to or larger than a threshold value. If the similarity is equal to or larger than the threshold value, the extraction of similar item values process (S40) proceeds to S420. If the similarity is smaller than the threshold value, the extraction of similar item values process (S40) proceeds to S425.

In step 420 (S420), the item value in the rectification history and the similarity calculated by the comparison section 508 are stored in association with each other.

In step 425 (S425), if the similarities of all of the item values acquired from the rectification history DB 600 to the one of the item values to be corrected have been calculated, the extraction of similar item values process (S40) proceeds to S430. If the similarities of all of the item values have not been calculated, the extraction of similar item values process (S40) proceeds to S410.

In step 430 (S430), if the similarities of all of the item values acquired from the rectification history DB 600 to all of the item values to be corrected have been calculated, the extraction of similar item values process (S40) proceeds to S435. If the similarities to all of the item values to be corrected have not been calculated, the extraction of similar item values process (S40) proceeds to S410.

In step 435 (S435), if each of the item values to be corrected has at least one item value of which similarity is equal to or larger than the threshold value, the extraction of similar item values process (S40) ends. If any of the item values to be corrected has no item value of which similarity is equal to or larger than the threshold value, the extraction of similar item values process (S40) proceeds to S440.

In step 440 (S440), the correction section 512 outputs the result of the OCR processing (input information) as values after correction since there is no correction goal.

Figure 11:
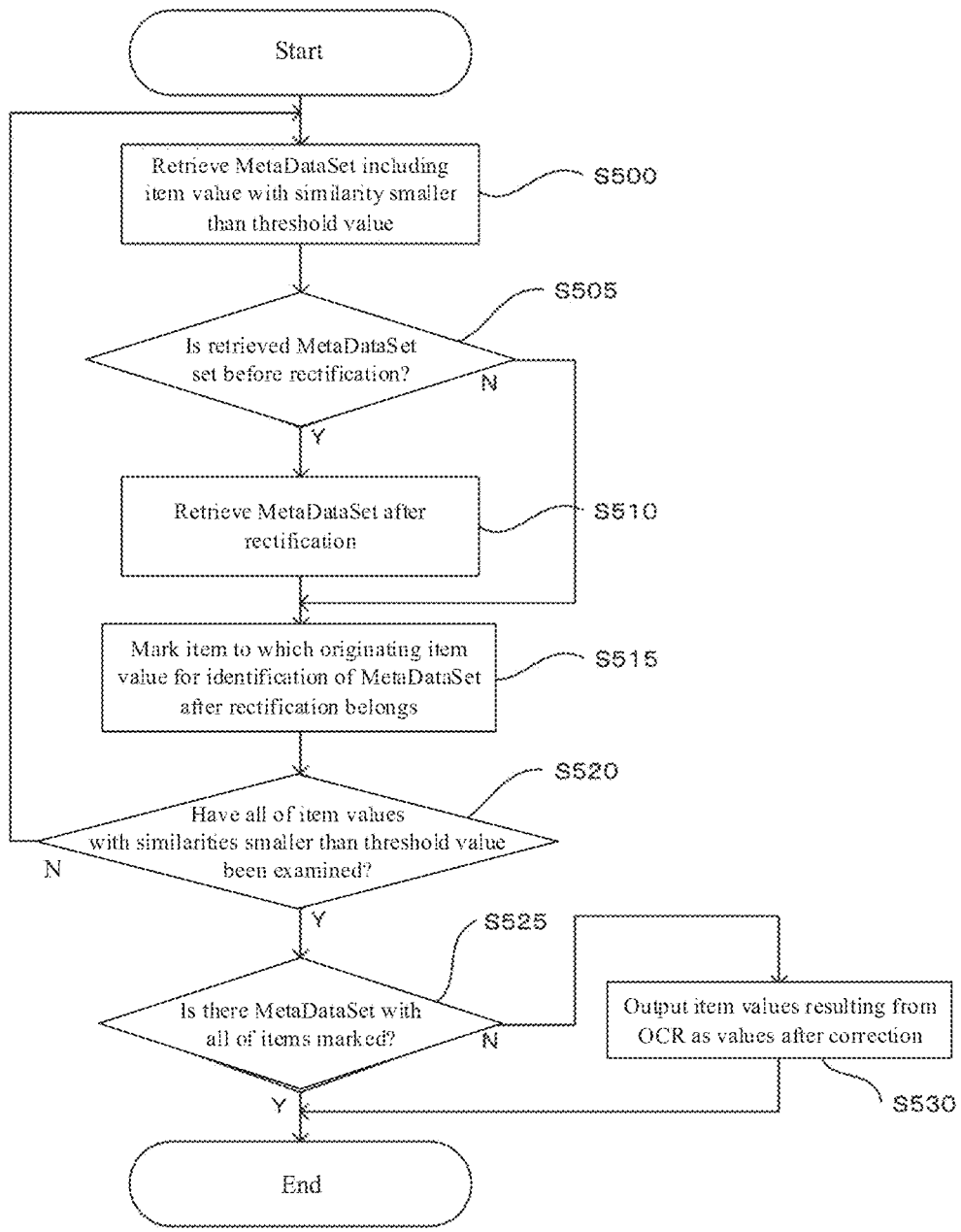
FIG. 11 is a flow chart illustrating refinement of sets of item values for use in correction (S50).

FIG. 11 is a flow chart illustrating refinement of sets of item values for use in correction (S50).

As exemplified in FIG. 11, in step 500 (S500), the set selection section 510 retrieves a MetaDataSet (a set of item values) including the item value of which similarity is smaller than the threshold value.

In step 505 (S505), if the retrieved MetaDataSet is a value before rectification, the refinement of sets of item values for use in correction (S50) proceeds to S510. If not a value before rectification, it proceeds to S515.

In step 510 (S510), the set selection section 510 retrieves the value after rectification regarding the retrieved MetaDataSet.

In step 515 (S515), the set selection section 510 records an item to which the originating item value belongs and the ID number of the MetaDataSet after rectification in association with each other so that it is evident that the MetaDataSet after rectification has been retrieved based on that item.

In step 520 (S520), if all of the MetaDataSets including the respective item values of which similarities are smaller than the threshold value have been retrieved, the refinement of sets of item values for use in correction (S50) proceeds to S525. If all of the MetaDataSets have not been retrieved, the refinement of sets of item values for use in correction (S50) proceeds to S500.

In step 525 (S525), if all of the items of a MetaDataSet are associated with the ID number of a single MetaDataSet, the refinement of sets of item values for use in correction (S50) ends. If all of the items are not associated with the ID number of a single MetaDataSet, the refinement of sets of item values for use in correction (S50) proceeds to S530.

In step 530 (S530), the correction section 512 outputs item values input through OCR as values after correction since there is no correction goal.

Figure 12:
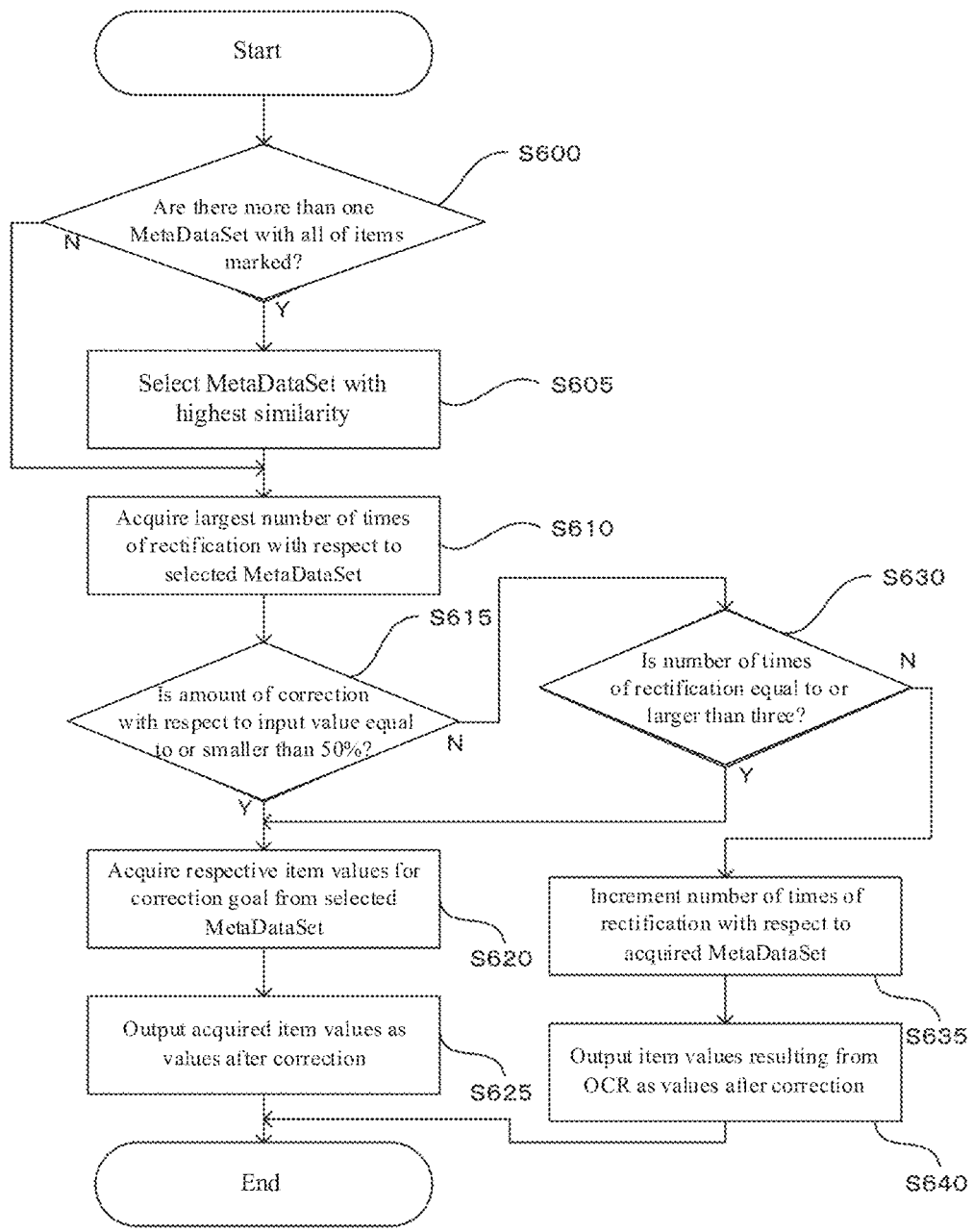
FIG. 12 is a flowchart illustrating the search for item values for correction goal and correction process (S60).

FIG. 12 is a flow chart illustrating the search for item values for correction goal and correction process (S60).

As exemplified in FIG. 12, in step 600 (S600), if there are more than one ID number of a single MetaDataSet with which all of the items of a MetaDataSet (a set of item values) are associated, the search for item values for correction goal and correction process (S60) proceeds to S605. If there is at most one ID number of a single MetaDataSet with which all of the items of a MetaDataSet are associated, the search for item values for correction goal and correction process (S60) proceeds to S610.

In step 605 (S605), the set selection section 510 selects a MetaDataSet of which total similarity calculated by the comparison section 508 is the highest out of the more than one MetaDataSet.

In Step 610 (S610), the properness evaluation section 514 acquires the largest number of times of rectification out of the histories of rectification by a user with respect to the MetaDataSet selected in S605.

In step 615 (S615), if the properness evaluation section 514 determines that the amount of correction between the item values after correction and the input values is equal to or smaller than 50%, the search for item values for correction goal and correction process (S60) proceeds to S620. If the amount of correction is larger than 50%, the search for item values for correction goal and correction process (S60) proceeds to S630.

In step 620 (S620), the correction section 512 acquires respective item values for the correction goal from the MetaDataSet selected in S605.

In step 625 (S625), the correction section 512 outputs the acquired respective item values for the correction goal as values after correction.

In step 630 (S630), if the properness evaluation section 514 determines that the number of times of rectification acquired in S610 is equal to or larger than three, the search for item values for correction goal and correction process (S60) proceeds to S620. If the properness evaluation section 514 determines that the number of times of rectification is smaller than three, the search for item values for correction goal and correction process (S60) proceeds to S635.

In step 635 (S635), the properness evaluation section 514 increments the number of times of rectification with respect to the acquired MetaDataSet.

In step 640 (S640), the correction section 512 outputs the item values input through OCR as values after correction since the conditions for correction are not satisfied.

Next, a specific example of extraction of item values for a correction goal and correction of false recognition will be described.

FIG. 13A exemplifies a scanned image (image data) and items and item values extracted from a false recognition result of the scanned image. Firstly, the "extraction of similar item value" of the "input information correction process" is carried out based on respective tables exemplified in FIG. 13B. Specifically, item values similar to the respective item values recognized by OCR are extracted from the rectification history DB 600. In this example, item values of which CompanyIDs are "Com_01" and "Com_03", item values of which AddressIDs are "Add_01" and "Add_03", item values of which URLIDs are "Url_01" and "Url_03", and item values of which EmailIDs are "Ema_01", "Ema_02", and "Ema_03" are extracted as similar item values regarding COMPANY, ADDRESS, URL, and E-MAIL, respectively.

Secondly, in the "refinement of sets of rectification history for use in correction" of the "input information correction process", a set of item values for use in correction is searched for. Here, a set of which CompanyID is "Com_03" is examined. One of the MetaDataSets of which CompanyID is "Com_03" is "Set_03" and "Set_03" has been registered as a "BeforeSetID" of "Cor_03" in a Correction table, which indicates that "Set_03" is a set before rectification. This leads to extraction of a MetaDataSetID "Set_09", which appears as an "AfterSetID" of the CorrectionID "Cor_03".

Figures 14A, 14B:
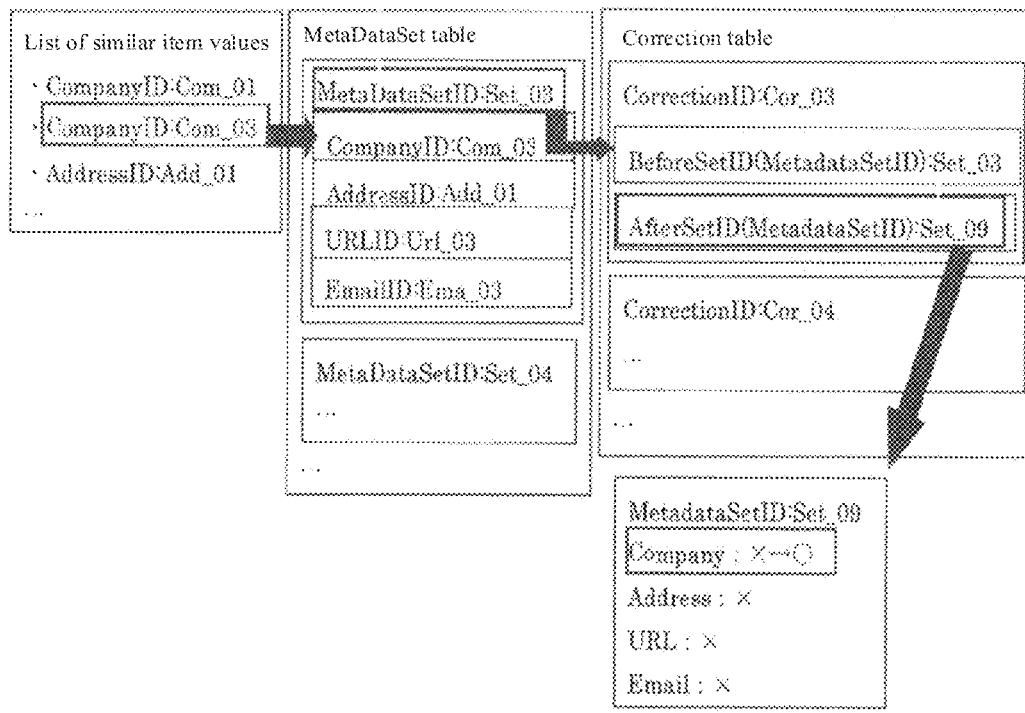

The MetaDataSetID "Set_09" has been retrieved based on the item of "COMPANY", and thus, as exemplified in FIG. 14A, the item which has caused "Set_09" to be found is marked.

Similarly, there are MetaDataSets "Set_04" to "Set_09" having the CompanyID "Com_03". In the Correction table, it can be seen that "Set_04" to "Set_08" have been rectified to "Set_09". Hence, information that the MetaDataSet "Set_09" has been retrieved based on the item of COMPANY is stored.

Such processing is performed on the respective item values of COMPANY, ADDRESS, URL, and E-MAIL that have been determined to be similar. FIG. 14B shows the result thereof. According to FIG. 14B, meta-information having possible item values for a correction goal in common (AfterSetID) can be acquired.

Thirdly, in the "search for item values for correction goal and correction process" of the "input information correction process", a set of item values for use in correction is selected and a correction process is performed. According to FIG. 14B, the MetaDataSetID including all of a correction goal in terms of COMPANY, ADDRESS, URL, and E-MAIL is only "Set_09", and thus the set of item values (MetaDataSet) with the MetaDataSetID "Set_09" is used for correction. A record with the MetaDataSetID "Set_09" is retrieved from the MetaDataSet table and each item table is searched for the ID number of each of the item values in that record. The respective item values after correction can thus be extracted. Furthermore, when the item values in FIG. 13A and the item values of the MetaDataSetID "Set_09" are compared, there is one different character in each of ADDRESS and E-MAIL and a total difference in all the item values is equal to or smaller than 50%. As a result, the values represented by the MetaDataSetID "Set_09" are output as the item values after correction.

Next, a case of correcting a set of item values that is not present in the rectification history DB 600 will be described.

Figure 15:
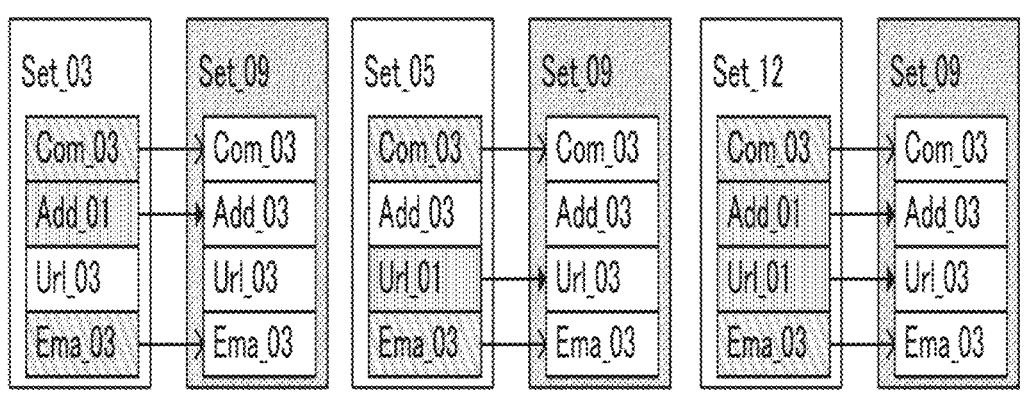
FIG. 15 is a diagram exemplifying a correction process on a set of item values that is not present in the rectification history DB 600.

FIG. 15 is a diagram exemplifying a correction process on a set of item values that is not present in the rectification history DB 600.

As exemplified in FIG. 15, a MetaDataSetID "Set_03" has been rectified into "Set_09" and a MetaDataSetID "Set_05" has been rectified into "Set_09". Now, consider a case of intending to correct a MetaDataSetID "Set_12 (a new set of item values that is not present in the MetaDataSet table in FIG. 13)". An AddressID "Add_01" in the MetaDataSetID "Set_12" appears in the MetaDataSetID "Set_03". A URLID "Url_01" in the MetaDataSetID "Set_12" appears in the MetaDataSetID "Set_05". A CompanyID "Com_03" and an EmailID "Ema_03" in the MetaDataSetID "Set_12" appear in both the MetaDataSetIDs "Set_03" and "Set_05". Based on the above, it can be seen that all of the item values in the MetaDataSetID "Set_12" are rectified to the item values in the MetaDataSetID "Set_09". This means that the MetaDataSetID "Set_12" can be corrected into the MetaDataSetID "Set_09".

In this way, the whole set of the item values is retrieved based on the values matching the respective item values, which allows for correction of a set of item values even if the set is not present in the rectification history DB 600.

Figure 16A:
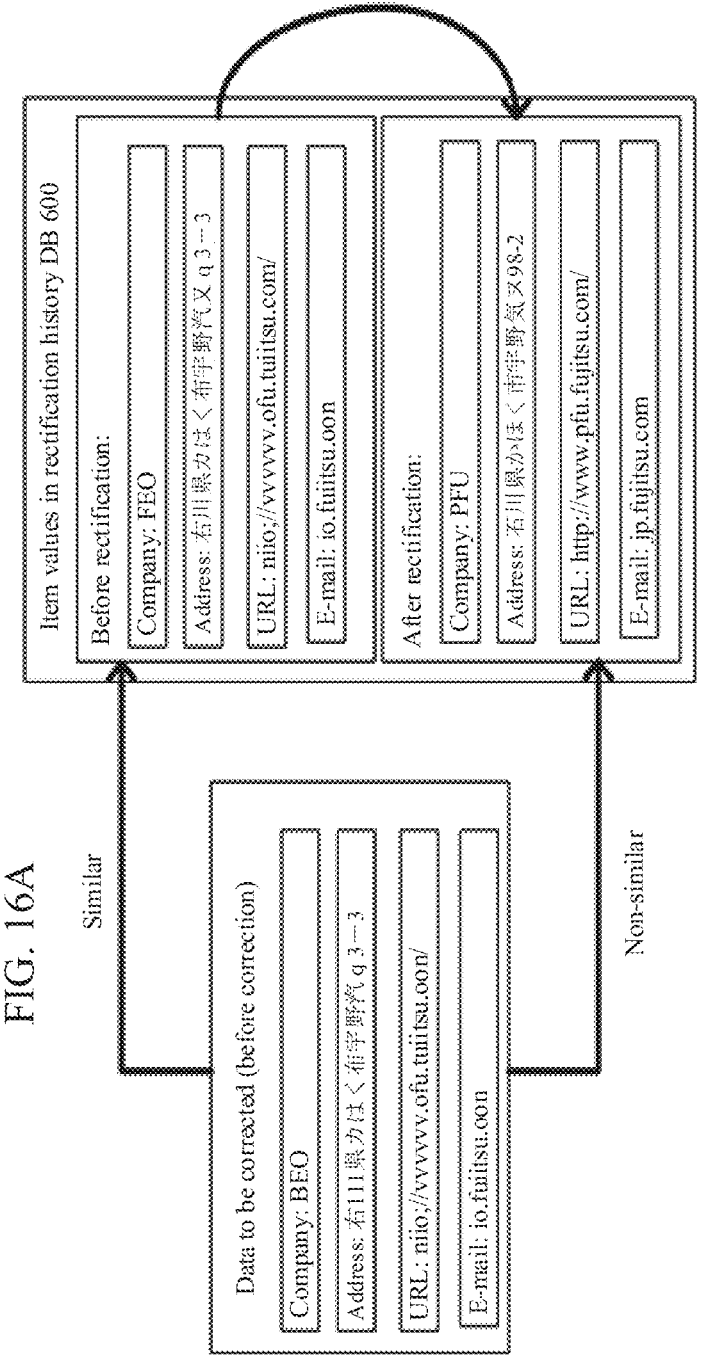

In the "refinement of sets of rectification history for use in correction", both of the item values before rectification and the item values after rectification are referenced. Considering a case of comparing the item values only with the item values after rectification, if an amount of rectification of the item values by a user is large, similarity would not be affirmed for the item values after rectification as a result of comparison and the item values after rectification might not be selected as possible item values for a correction goal in such a correction process on similar item values. For example, as exemplified in FIG. 16A, the item values to be corrected and the item values before rectification are similar, and thus the item values before rectification can be extracted by similarity retrieval. This allows for extraction of the item values after rectification as possible item values for a correction goal from the rectification history DB 600. However, the item values to be corrected and the item values after rectification are not similar, and thus the item values after rectification fail to be extracted by the similarity retrieval.

Figure 16B:
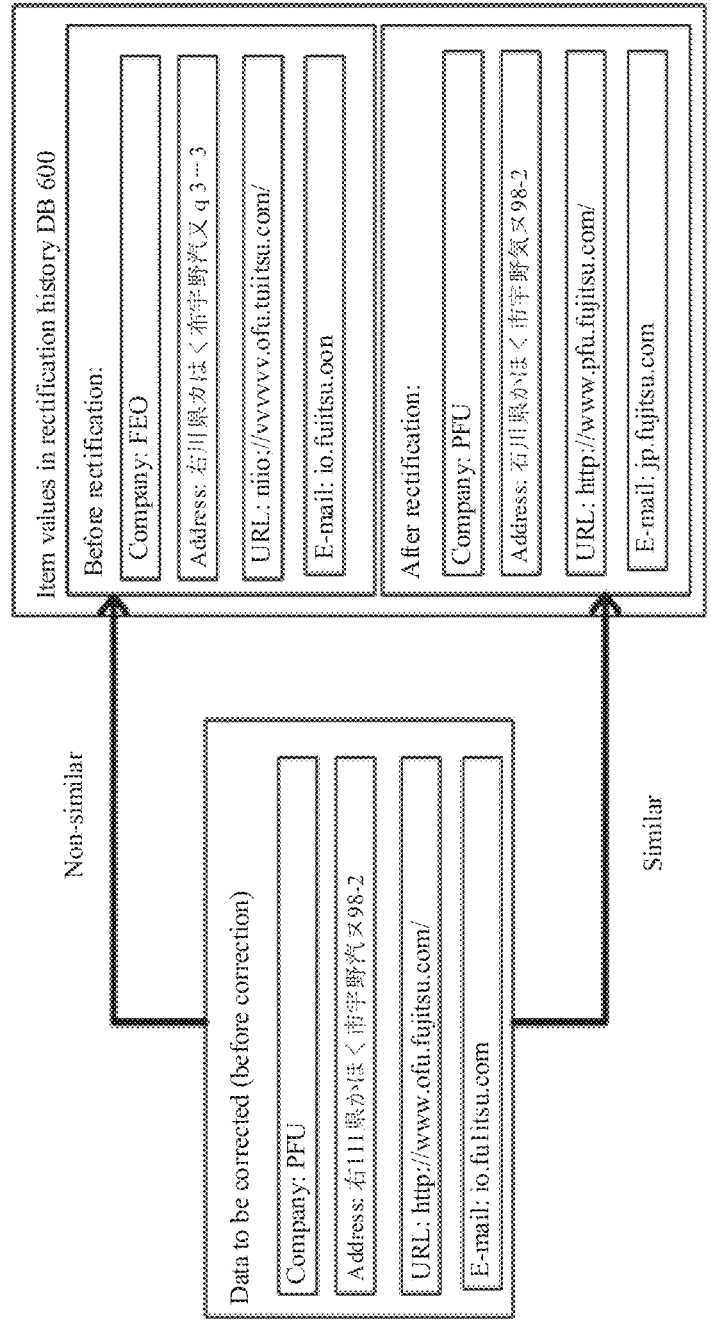

Meanwhile, if the item values rectified by a user are significantly different from the item values of accurate meta-information, even comparison with the item values before rectification would not affirm similarity and the item values before rectification might not be selected as possible item values for a correction goal at the time of correction with item values similar to those of the accurate meta-information. As exemplified in FIG. 16B, the item values to be corrected and the item values after rectification are respectively similar, and thus the item values after rectification can be extracted by similarity retrieval. However, the item values to be corrected and the item values before rectification are not similar, and thus the item values before rectification fail to be extracted by the similarity retrieval.

Next, processing time of a conventional technique and of the input information correction apparatus 5 will be described.

The rectification history DB 600 in the input information correction apparatus 5 stores data in parts of respective items and a duplicated item value in the rectification history DB 600 is skipped in string search. When searching the rectification history DB 600 in correction using the data in FIG. 13B, the number of times that the string search is performed reaches sixteen. In a case of the conventional search technique, search is performed per item for all the sets in the MetaDataSet table in FIG. 13B, resulting in 44 times of processing in total. The number of times of search becomes almost three times larger and the absolute difference in the numbers of times of search becomes larger as the number of stored data pieces increases.

FIGS. 17A and 17B are results of actual measurements of the processing time. Between FIGS. 17A and 17B, the numbers of business cards registered to the rectification history DB 600 are different. Assume that there is no duplicated item value in each item of the business cards, that character recognition by OCR processing outputs false results in all the items and a user rectifies all the items, that there is no blank item to be corrected, and that each amount of rectification regarding all the items by the user is smaller than 50% (satisfies the condition for correction). In FIG. 17A, the input information correction apparatus 5 operated more slowly in processing than the conventional technique because of overhead due to use of the rectification history DB 600. This is because the small number of records made the whole processing time short and the contribution of the overhead significant.

Figure 17C:
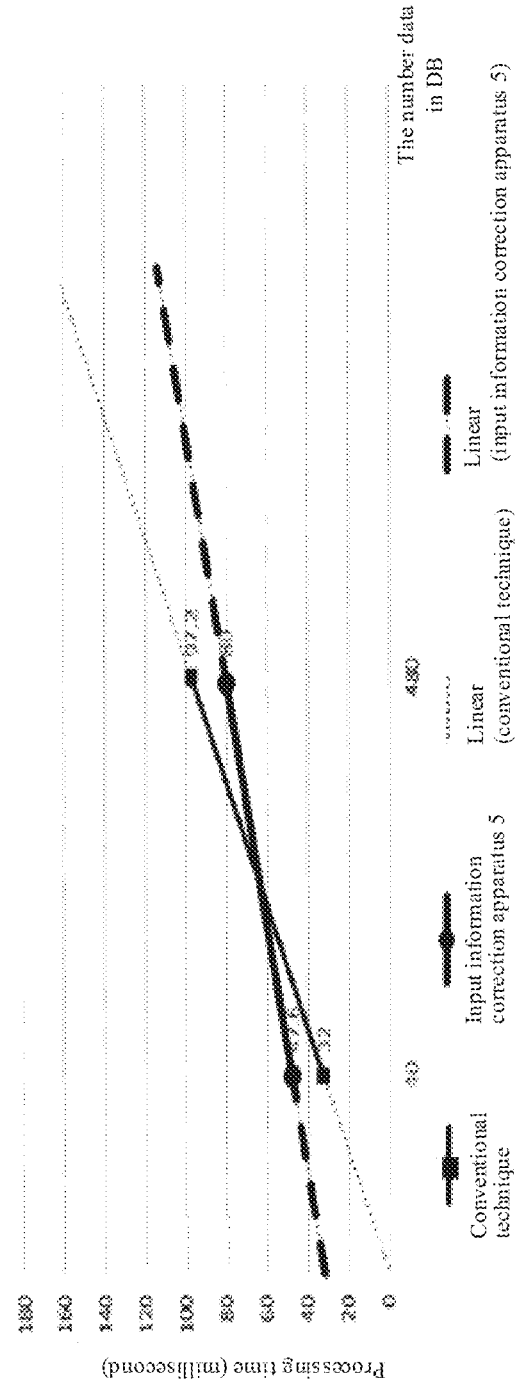
FIG. 17C is a graph representing changes including prediction lines of the processing time versus the number of data pieces of a conventional technique and of an input information correction apparatus.

On the other hand, in FIG. 17B where the number of the records is larger, the input information correction apparatus 5 operated faster in processing and the processing time was twice as much as that in FIG. 17A. As exemplified in FIG. 17C, processing time of the input information correction apparatus 5 became about 1.6 times more even when the number of registered business cards increases twelve-fold, which indicates that the processing time gradually increases with respect to the number of the registered data pieces.

Furthermore, FIG. 17D shows a file size of a dictionary used for each of the conventional technique and the input information correction apparatus 5 in the case of FIGS. 17A and 17B. When the data for 480 companies has been stored, the file size of the input information correction apparatus 5 is quarter as large as that of the conventional technique. This is because a duplicated item value is not registered to the dictionary and item values are managed with ID numbers. The file size differs depending on the number of times of rectification by a user even when the same number of business cards are dealt with but the file size will be more largely reduced by the input information correction apparatus 5 as the number of times of rectification increases.

As described above, according to the input information correction apparatus 5 of the present embodiment, a set of item values for a correction goal is extracted based on similarity between the item values of input information and the item values in rectification histories, which allows for correction of false recognition resulting from OCR processing of the input information according to the extracted set of the item values.

Additionally, the input information correction apparatus 5 selects a set of item values for a correction goal based on similarity between a set of item values of input information and a set of item values in the rectification histories, which allows for correction of the false recognition resulting from OCR processing even if there is no completely match.

Furthermore, the input information correction apparatus 5 extracts a set of item values for a correction goal based on the item values both before rectification and after rectification in the rectification history by using each similar value for each of the item values even when the set of the item values has never been rectified by a user previously. This allows for correction using the set of the item values in the rectification histories.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory;
a non-volatile memory; and
a processor coupled to the memory and the non-volatile memory, the processor configured to:

store characters recognized in the character recognition processing and characters rectified by a user regarding these recognized characters in association with items;
compare, for the respective items, a newly input result of the character recognition processing with the recognized characters and rectified characters stored in the non-volatile memory to calculate total similarity;
select a set of the characters of which the calculated total similarity is the highest based on the calculated similarity;
evaluate properness of the selected set of the characters based on an amount of corrections and a number of times of rectifications corresponding to rectification history stored in the non-volatile memory; and
correct the newly input result of the character recognition processing by using the selected set of the characters when the properness is affirmed.

2. The information processing apparatus according to claim 1, wherein the processor is further configured to:
rectify the result of the character recognition processing depending on a user operation; and
additionally register the items and the characters after rectification in association with the characters before rectification into the non-volatile memory.

3. The information processing apparatus according to claim 1, wherein the processor is configured to:
determine if the characters before rectification or the characters after rectification stored in the non-volatile memory in association with each other are similar to the newly input characters, that the characters are matched.

4. An information processing method comprising the steps of:
storing characters recognized in the character recognition processing and characters rectified by a user regarding these recognized characters in association with items;
comparing, for the respective items, a newly input result of the character recognition processing with the recognized characters and rectified characters stored to calculate total similarity;
selecting a set of the stored characters of which the calculated total similarity is the highest based on the calculated similarity;
evaluating properness of the selected set of the characters based on an amount of corrections and a number of times of rectifications corresponding to rectification history stored; and
correcting the newly input result of the character recognition processing by using the selected set of the characters when the properness is affirmed.

5. A non-transitory computer-readable recording medium storing thereon a computer program that causes a computer to perform a method comprising:
storing characters recognized in the character recognition processing and characters rectified by a user regarding these recognized characters in association with items;
comparing, for the respective items, a newly input result of the character recognition processing with the recognized characters and rectified characters stored to calculate total similarity;
selecting a set of the stored characters of which the calculated total similarity is the highest based on the calculated similarity;
evaluating properness of the selected set of the characters based on an amount of corrections and a number of times of rectifications corresponding to rectification history stored; and correcting the newly input result of the character recognition processing by using the selected set of the characters when the properness is affirmed.

\* \* \* \* \*